United States Patent
Ding et al.

(10) Patent No.: US 10,778,657 B2
(45) Date of Patent: Sep. 15, 2020

(54) SCHEMES OF HOMOMORPHIC RE-ENCRYPTION

(71) Applicant: Nokia Technologies Oy, Espoo (FI)

(72) Inventors: Wenxiu Ding, Xi'an (CN); Zheng Yan, Shaanxi (CN)

(73) Assignee: Nokia Technologies Oy, Espoo (FI)

( * ) Notice: Subject to any disclaimer, the term of this patent is extended or adjusted under 35 U.S.C. 154(b) by 73 days.

(21) Appl. No.: 15/779,958

(22) PCT Filed: Dec. 10, 2015

(86) PCT No.: PCT/CN2015/097013
§ 371 (c)(1),
(2) Date: May 30, 2018

(87) PCT Pub. No.: WO2017/096590
PCT Pub. Date: Jun. 15, 2017

(65) Prior Publication Data
US 2018/0359229 A1 Dec. 13, 2018

(51) Int. Cl.
*H04L 29/06* (2006.01)
*H04L 9/00* (2006.01)
(Continued)

(52) U.S. Cl.
CPC .......... *H04L 63/0464* (2013.01); *H04L 9/008* (2013.01); *H04L 9/085* (2013.01); *H04L 9/30* (2013.01); *H04L 2209/76* (2013.01)

(58) Field of Classification Search
CPC ....... H04L 63/0464; H04L 9/008; H04L 9/30; H04L 2209/76; H04L 9/085
(Continued)

(56) References Cited

U.S. PATENT DOCUMENTS

| 7,856,100 B2 | 12/2010 | Wang et al. |
| 8,630,422 B2 | 1/2014 | Gentry |

(Continued)

FOREIGN PATENT DOCUMENTS

| CN | 103401871 A | 11/2013 |
| CN | 103607278 A | 2/2014 |

(Continued)

OTHER PUBLICATIONS

Ayday et al., "Protecting and Evaluating Genomic Privacy in Medical Tests and Personalized Medicine", Proceedings of the 12th ACM workshop on Workshop on privacy in the electronic society, Nov. 4, 2013, pp. 95-106.

(Continued)

*Primary Examiner* — David J Pearson
*Assistant Examiner* — Badri Champakesan
(74) *Attorney, Agent, or Firm* — Laine IP Oy

(57) ABSTRACT

Method and apparatus are disclosed for homomorphic re-encryption schemes in a system comprising a cloud service provider (CSP), a third authorized party (TAP), a data requestor (DR) and a plurality of data providers (DPs). According to an embodiment, a method implemented at a CSP comprises: in response to a request from a TAP, obtaining from a plurality of DPs cipher texts of their respective data, based on the request, wherein each DP is able to homomorphically encrypt its data; analyzing the cipher texts; and sending the analyzing result to the TAP, wherein the TAP is able to re-encrypt the analyzing result, such that a DR can decrypt the re-encrypted analyzing result with the DR's secret key. According to another embodiment, a method implemented at a CSP comprises: collecting from a plurality of DPs cipher texts of their respective data, wherein each DP is able to homomorphically encrypt its data; analyzing the cipher texts; in response to a request (Continued)

from a TAP, encrypting the analyzing result; and sending the encrypted analyzing result to the TAP, wherein the TAP is able to re-encrypt the encrypted analyzing result, such that a DR can decrypt the re-encrypted analyzing result with the DR's secret key.

17 Claims, 7 Drawing Sheets

(51) Int. Cl.
*H04L 9/08* (2006.01)
*H04L 9/30* (2006.01)

(58) Field of Classification Search
USPC .............................................................. 726/4
See application file for complete search history.

(56) References Cited

U.S. PATENT DOCUMENTS

| | | | | |
|---|---|---|---|---|
| 10,223,547 | B2* | 3/2019 | Rane | G06F 21/6245 |
| 10,277,563 | B2* | 4/2019 | Rao | H04L 63/061 |
| 10,362,001 | B2* | 7/2019 | Yan | H04L 63/061 |
| 2011/0264920 | A1 | 10/2011 | Rieffel et al. | |
| 2011/0283099 | A1* | 11/2011 | Nath | H04L 9/008 |
| | | | | 713/150 |
| 2014/0115321 | A1* | 4/2014 | Isshiki | H04L 9/14 |
| | | | | 713/153 |
| 2014/0208101 | A1* | 7/2014 | Naganuma | H04L 9/008 |
| | | | | 713/164 |
| 2015/0244517 | A1 | 8/2015 | Nita | |
| 2015/0270964 | A1* | 9/2015 | Yasuda | H04L 9/0825 |
| | | | | 713/171 |
| 2015/0318991 | A1* | 11/2015 | Yasuda | H04L 9/008 |
| | | | | 380/28 |
| 2016/0205114 | A1* | 7/2016 | Yan | H04L 63/08 |
| | | | | 713/168 |
| 2018/0131512 | A1* | 5/2018 | Gajek | H04L 9/008 |

FOREIGN PATENT DOCUMENTS

| | | | |
|---|---|---|---|
| CN | 104025498 A | 9/2014 | |
| EP | 2677682 A1 | 12/2013 | |
| EP | 2924911 A1 | 9/2015 | |
| WO | WO-2013064723 A1 * | 5/2013 | ............ H04L 9/008 |
| WO | 2015/024173 A1 | 2/2015 | |
| WO | 2015/131394 A1 | 9/2015 | |

OTHER PUBLICATIONS

Castelluccia et al., "Efficient and Provably Secure Aggregation of Encrypted Data in Wireless Sensor Networks", ACM Transactions on Sensor Networks (TOSN), vol. 5, No. 3, Article No. 20, May 2009, 36 pages.

Chan et al., "Privacy-Preserving Stream Aggregation with Fault Tolerance", Financial Cryptography and Data Security, 2012, 20 pages.

Li et al., "Efficient and Privacy-Aware Data Aggregation in Mobile Sensing", IEEE Transactions on Dependable and Secure Computing, vol. 11, No. 2, Mar.-Apr. 2014, pp. 115-129.

Li et al., "Efficient Privacy-Preserving Stream Aggregation in Mobile Sensing with Low Aggregation Error", Privacy Enhancing Technologies, 2013, 20 pages.

Joye et al., "A Scalable Scheme for Privacy-Preserving Aggregation of Time-Series Data", Financial Cryptography and Data Security, vol. 7879, 2013, 15 pages.

Wang et al., "A Tale of Two Clouds: Computing on data Encrypted Under Multiple Keys", IEEE Conference on Communications and Network Security (CNS), Oct. 29-31, 2014, pp. 337-345.

Yan et al., "A Survey on Trust Management for Internet of Things", Journal of Network and Computer Applications, vol. 42, Jun. 2014, pp. 120-134.

Pavlov et al., "Supporting Privacy in Decentralized Additive Reputation Systems", International Conference on Trust Management, 2004, pp. 108-119.

Erkin et al., "Generating Private Recommendations in a Social Trust Network", International Conference on Computational Aspects of Social Networks (CASoN), Oct. 19-21, 2011, 6 pages.

Bogdanov et al., "Deploying Secure Multi-Party Computation for Financial Data Analysis", Financial Cryptography and Data Security, 2012, 8 pages.

Ateniese et al., "Improved Proxy Re-Encryption Schemes with Applications to Secure Distributed Storage", ACM Transactions on Information and System Security (TISSEC), vol. 9, No. 1, Feb. 2006, pp. 1-30.

Cramer et al., "Universal Hash Proofs and a Paradigm for Adaptive Chosen Ciphertext Secure Public-Key Encryption", Advances in Cryptology—EUROCRYPT, 2002, pp. 45-64.

Paillier, "Public-Key Cryptosystems Based on Composite Degree Residuosity Classes", Advances in Cryptology—EUROCRYPT, 1999, pp. 223-238.

Elgamal, "A Public Key Cryptosystem and a Signature Scheme Based on Discrete Logarithms", IEEE Transactions on Information Theory, vol. 31, No. 4, Jul. 1985, pp. 469-472.

"A Secure Cloud Server System Using Proxy Re-Encryption Model", JP Infotech, Retrieved on May 24, 2018, Webpage available at : https://pdfs.semanticscholar.org/f1d9/82f9a287a4ce70a0a57a8eb3d51c166b301f.pdf.

International Search Report and Written Opinion received for corresponding Patent Cooperation Treaty Application No. PCT/CN2015/097013, dated Aug. 29, 2016, 12 pages.

Ayday et al: "Privacy-Enhancing Technologies for Medical Tests Using Genomic Data", Technical Report, Dec. 28, 2012.

Luo et al: New construction of identity-based proxy reencryption. 10th Annual ACM Workshop on Digital Rights Management 2010 (DRM 10) : Held in Conjunction With CCS 10 ; Chicago, Curran Red Hook, NY, Oct. 4, 2010, pp. 47-50.

* cited by examiner

SCHEMES OF HOMOMORPHIC RE-ENCRYPTION

RELATED APPLICATION

This application was originally filed as PCT Application No. PCT/CN2015/097013 filed Dec. 10, 2015.

FIELD OF THE INVENTION

Embodiments of the disclosure generally relate to data processing, and, more particularly, to homomorphic encryption and decryption in cloud computing.

BACKGROUND

Cloud computing provides various services to users based on their demands by rearranging resources over networks. As one of the most promising services, cloud computing helps reducing heavy burden of complex computation at user devices and breaking the bottlenecks of restricted resources in order to satisfy user demands at any time and in any place.

Data aggregation is concerned with: collecting and analyzing the personal information of lots of involved parties to obtain some important aggregated or processed information. With the fast growth and development of the network, more data are monitored/sensed/collected by Internet of "things" for deep analysis. The cloud computing can assist complex computation due to its great computation ability in order to dig out significant information. In many application scenarios or systems, data are collected from different entities in order to find out crucial information to support advanced and intelligent services. For example, an aggregator may gather the sales data to discover the most popular products among the consumers. The website can enhance the browsing experiences of consumers by recommending the most popular products to satisfy the appetites of consumers in a personal way. In another example, trust evaluation always needs to collect evidence or recommendation for processing and analyzing in pervasive social networking based on the internet or a self-organized mobile ad hoc network. A trust evaluator needs to aggregate user feedback and statistics in order to assess reputation and trust. Data aggregation and analysis can be widely applied in many applications in order to offer advanced services.

In view of this, it would be advantageous to provide a way to allow for flexible, secure and efficient data aggregation in cloud computing.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

According to one aspect of the disclosure, it is provided a method implemented at a cloud service provider (CSP), the method comprising: in response to a request from a third authorized party (TAP), obtaining from a plurality of data providers (DPs) cipher texts of their respective data, based on the request, wherein each DP is able to homomorphically encrypt its data; analyzing the cipher texts; and sending the analyzing result to the TAP, wherein the TAP is able to re-encrypt the analyzing result, such that a data requestor (DR) can decrypt the re-encrypted analyzing result with the DR's secret key.

According to another aspect of the disclosure, the request comprises the DR's public key, and each DP is able to homomorphically encrypt its data with the DR's public key. The TAP is able to re-encrypt the analyzing result with the TAP's secret key.

According to another aspect of the disclosure, the step of analyzing comprises: aggregating the cipher texts. The decrypted analyzing result comprises a sum or a product of the plurality of DPs' data.

According to another aspect of the disclosure, the homomorphic encryption is based on Paillier cryptosystem. The re-encryption is based on a proxy re-encryption (PRE) scheme where a secret key corresponding to the homomorphic encryption is the product of the TAP's secret key and the DR's secret key.

According to another aspect of the disclosure, it is provided a method implemented at a cloud service provider (CSP), the method comprising: collecting from a plurality of data providers (DPs) cipher texts of their respective data, wherein each DP is able to homomorphically encrypt its data; analyzing the cipher texts; in response to a request from a third authorized party (TAP), encrypting the analyzing result; and sending the encrypted analyzing result to the TAP, wherein the TAP is able to re-encrypt the encrypted analyzing result, such that a data requestor (DR) can decrypt the re-encrypted analyzing result with the DR's secret key.

According to another aspect of the disclosure, each DP is able to homomorphically encrypt its data with the TAP's public key. The request comprises the DR's public key, and the step of encrypting comprises: encrypting the analyzing result with the DR's public key. The TAP is able to re-encrypt the encrypted analyzing result with the TAP's secret key.

According to another aspect of the disclosure, each DP is able to homomorphically encrypt its data with the TAP's public key and the CSP's public key. The step of encrypting comprises: encrypting the analyzing result with the CSP's secret key. The TAP is able to re-encrypt the encrypted analyzing result with the TAP's secret key and the DR's public key.

According to another aspect of the disclosure, the step of analyzing comprises: aggregating the cipher texts. The decrypted analyzing result comprises a sum or a product of the plurality of DPs' data.

According to another aspect of the disclosure, the homomorphic encryption is based on Paillier cryptosystem.

According to another aspect of the disclosure, it is provided a method implemented at a third authorized party (TAP), comprising: in response to a first request from a data requestor (DR), checking the DR's eligibility; in response to a negative check result, neglecting the first request; in response to a positive check result, sending a second request to a cloud service provider (CSP), wherein the CSP is able to process cipher texts obtained from a plurality of data providers (DPs), and each DP is able to homomorphically encrypt its data; in response to the processing result from the CSP, re-encrypting the processing result, such that the DR can decrypt the re-encrypted processing result with the DR's secret key; and sending the re-encrypted processing result to the DR.

According to another aspect of the disclosure, the first request comprises the DR's public key, and the second request is the same as the first request. The CSP is able to obtain the cipher texts based on the second request, and analyze the cipher texts, and each DP is able to homomorphically encrypt its data with the DR's public key included in the second request. The step of re-encrypting comprises: re-encrypting the analyzing result with the TAP's secret key.

According to another aspect of the disclosure, the first request comprises the DR's public key, and the second request is the same as the first request. The CSP is able to obtain and analyze the cipher texts prior to the first request, and encrypt the analyzing result with the DR's public key included in the second request, and each DP is able to homomorphically encrypt its data with the TAP's public key. The step of re-encrypting comprises: re-encrypting the encrypted analyzing result with the TAP's secret key.

According to another aspect of the disclosure, the first request comprises the DR's public key, and the second request is the first request excluding the DR's public key. The CSP is able to obtain and analyze the cipher texts prior to the first request, and encrypt the analyzing result with the CSP's secret key in response to the second request, and each DP is able to homomorphically encrypt its data with the TAP's public key and the CSP's public key. The step of re-encrypting comprises: re-encrypting the encrypted analyzing result with the TAP's secret key and the DR's public key included in the first request.

According to another aspect of the disclosure, the method implemented at the TAP further comprises: saving the encrypted analyzing result from the CSP; in response to a third request from another DR for acquiring the same analyzing result, checking the another DR's eligibility; in response to a negative check result, neglecting the third request; in response to a positive check result, re-encrypting the saved encrypted analyzing result with the TAP's secret key and the another DR's public key included in the third request, such that the another DR can decrypt the re-encrypted analyzing result with the another DR's secret key; and sending the re-encrypted analyzing result to the another DR.

According to another aspect of the disclosure, the CSP is able to aggregate the cipher texts. The decrypted analyzing result comprises a sum or a product of the plurality of DPs' data.

According to another aspect of the disclosure, it is provided a method implemented at a data requestor (DR), the method comprising: sending a first request to a third authorized party (TAP); authenticating the DR's eligibility to the TAP, wherein the TAP is able to send a second request to a cloud service provider (CSP) in response to a positive authentication result, the CSP is able to process cipher texts obtained from a plurality of data providers (DPs), each DP is able to homomorphically encrypt its data, and the TAP is able to re-encrypt the processing result; and in response to the re-encrypted processing result from the TAP, decrypting the re-encrypted processing result with the DR's secret key.

According to another aspect of the disclosure, the first request comprises the DR's public key, and the second request is the same as the first request. The CSP is able to obtain the cipher texts based on the second request, and analyze the cipher texts, and each DP is able to homomorphically encrypt its data with the DR's public key included in the second request. The TAP is able to re-encrypt the analyzing result with the TAP's secret key.

According to another aspect of the disclosure, the first request comprises the DR's public key, and the second request is the same as the first request. The CSP is able to obtain and analyze the cipher texts prior to the first request, and encrypt the analyzing result with the DR's public key included in the second request, and each DP is able to homomorphically encrypt its data with the TAP's public key. The TAP is able to re-encrypt the encrypted analyzing result with the TAP's secret key.

According to another aspect of the disclosure, the first request comprises the DR's public key, and the second request is the first request excluding the DR's public key. The CSP is able to obtain and analyze the cipher texts prior to the first request, and encrypt the analyzing result with the CSP's secret key in response to the second request, and each DP is able to homomorphically encrypt its data with the TAP's public key and the CSP's public key. The TAP is able to re-encrypt the encrypted analyzing result with the TAP's secret key and the DR's public key included in the first request.

According to another aspect of the disclosure, it is provided a method implemented at a data provider (DP), the method comprising: homomorphically encrypting the DP's data to generate its cipher text; and sending the cipher text to a cloud service provider (CSP), wherein the CSP is able to process cipher texts obtained from a plurality of DPs, and a third authorized party (TAP) is able to re-encrypt the processing result, such that a data requestor (DR) can decrypt the re-encrypted processing result with the DR's secret key.

According to another aspect of the disclosure, the step of encrypting comprises: in response to a first request from the CSP, homomorphically encrypting the DP's data with the DR's public key included in the first request. The CSP is able to analyze the cipher texts, and the TAP is able to re-encrypt the analyzing result with the TAP's secret key.

According to another aspect of the disclosure, the step of encrypting comprises: homomorphically encrypting the DP's data with the TAP's public key. The CSP is able to analyze the cipher texts, and in response to a second request from the TAP, encrypt the analyzing result with the DR's public key included in the second request. The TAP is able to re-encrypt the encrypted analyzing result with the TAP's secret key.

According to another aspect of the disclosure, the step of encrypting comprises: homomorphically encrypting the DP's data with the TAP's public key and the CSP's public key. The CSP is able to analyze the cipher texts, and in response to a second request from the TAP, encrypt the analyzing result with the CSP's secret key. The TAP is able to re-encrypt the encrypted analyzing result with the TAP's secret key and the DR's public key.

According to another aspect of the disclosure, it is provided an apparatus comprising means configured to perform all steps of any one of the above described methods.

According to another aspect of the disclosure, it is provided an apparatus comprising: at least one processor; and at least one memory including computer-executable code, wherein the at least one memory and the computer-executable code are configured to, with the at least one processor, cause the apparatus to perform all steps of any one of the above described methods.

According to another aspect of the disclosure, it is provided a computer program product comprising at least one non-transitory computer-readable storage medium having computer-executable program code stored therein, the computer-executable code being configured to, when being executed, cause an apparatus to operate according to any one of the above described methods.

These and other objects, features and advantages of the disclosure will become apparent from the following detailed description of illustrative embodiments thereof, which are to be read in connection with the accompanying drawings.

DETAILED DESCRIPTION

Figure 1:
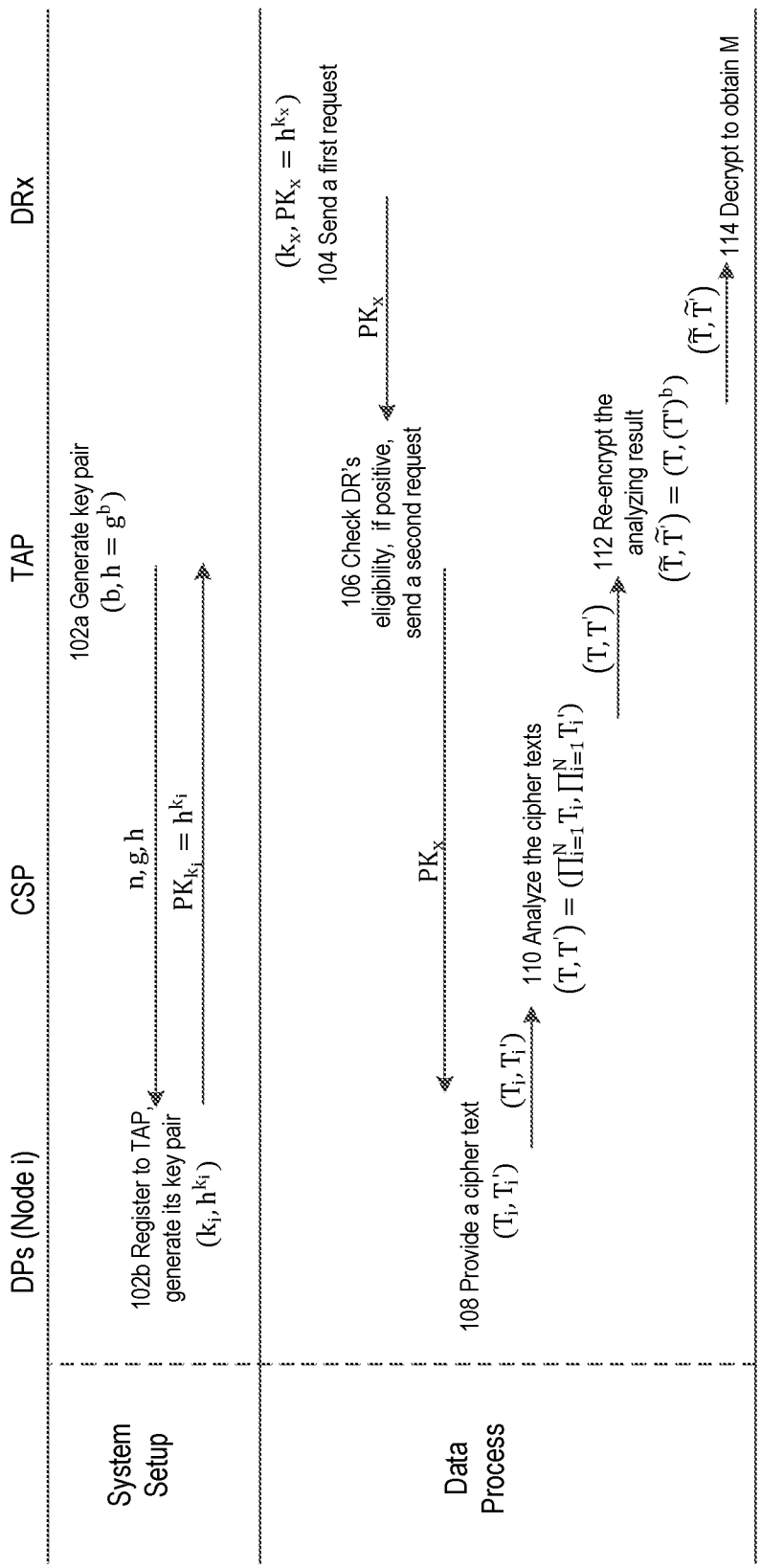
FIG. 1 depicts a flowchart of an overall system process for homomorphic re-encryption according to the first scheme of the present disclosure.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As mentioned above, data aggregation and analysis can be widely applied in many applications in order to offer advanced services. However, aggregating the collected data from different parties may impact the privacy of raw data providers or the human-beings being involved. Specifically, on one hand, data aggregation is based on the personal data or sensitive data of the involved parties. On the other hand, the aggregator (for example, a Cloud Service Provider (CSP)) cannot be fully trusted by data providers in many situations. Because each aggregated result may present significant private information of data providers, such as the routine activities, preference, health conditions or even assets, the data providers would not be willing to provide their data for further analysis for the fear of intruding their privacy. For example, the medical and clinical researchers want to analyze the relationship between age and a special serious disease. The more data collected, the more accurate it would be. But many patients do not want to provide their health data as it relates to personal privacy and revealing these data could bring a risk to the patients. If the disease is infectious, they would become more reluctant to share. Therefore, privacy preservation is one of the most crucial and important problems to be solved in data aggregation and analysis. This requests the private data belonging to different parties should be aggregated and analyzed in a secure way and the aggregation and analysis results can only be accessed by eligible parties. Thereby, it is preferred that the data are collected and processed both in an encrypted manner and the final processing result can only be accessed by the authorized party with eligibility, for enhancing the privacy of data providers and encouraging acceptance of the system.

Homomorphic encryption (either partial or full homomorphic encryption) is a kind of technique to support secure data aggregation, process and analysis. However, the homomorphic encryption result cannot be easily accessed by different eligible parties with essential access control.

Moreover, most methods focus on the problem of aggregating the data for designated requesting parties. But sometimes the data are gathered all the time and the requesting party is normally not specified during data collection. Afterwards, some authorized requestors want to acquire the data for further study or usage. It is a crucial issue to distribute the aggregated, processed or analyzed encrypted results to an eligible requestor, allowing it to access the plain processing result while protecting the encrypted results from being obtained by others, including the data aggregation/processing/analyzing parties (for example, CSPs).

The present disclosure takes into consideration the scenario where the requestors are unpredictable or unspecified, and proposes a feasible solution by which the homomorphic encryption result can be re-encrypted using an eligible party's re-encryption key, thus only this party can decrypt the re-encrypted result while other parties cannot. Thereby, the solution can flexibly control access to the homomorphic encryption results through re-encryption in a personalized way, and solve the problem of distributing the aggregated/processed/analyzed results to any unspecified authorized requestors while preserving the privacy of data providers and protecting the aggregated/processed/analyzed result. Hereinafter, the solution will be described in detail in four sections entitled "the basic principle of homomorphic re-encryption", "the overall system process", "the processes at individual parties" and "the system structure".

I. The Basic Principle of Homomorphic Re-Encryption

Generally speaking, the cipher text of entity A can be converted into that of entity B through the re-encryption of a proxy. The encryption employed in this process is based on homomorphic cryptosystem. In this section, Paillier cryptosystem is merely used as an exemplary example for explaining the basic principle of the present disclosure, and any other homomorphic cryptosystem can also be applied into the present disclosure to achieve the same technical effects.

The Paillier cryptosystem is based on the cyclic group of quadratic residues modulo $n^2$. The public parameters are n, g and $h=g^x$ with g of order $\lambda(n)=2p'q'$. The master secret key is the factorization of n=p*q (where p=2p'+1, q=2q'+1 are safe primes), and the "weak" secret key is $x \in [1, n^2/2]$. The generator g can be easily found by selecting a random $t \in \mathbb{Z}_n$ and computing $g=-t^{2n}$ in system initialization. In the schemes of the present disclosure, the master key is kept unknown.

To encrypt a message $m \in \mathbb{Z}_n$, it is required to select a random $r \in [1, n/4]$ and compute: $T=g^r$, $T'=h^r(1+m*n)$ (mod $n^2$), wherein the public key for homomorphic encryption is $pk=h=g^x$, and the secret key is sk=x. The computed result (T, T') is the cipher text of the message m. If the secret key x is known, then the message m can be recovered directly as:

$$m=L(T'/T^x \bmod n^2),$$

where $L(u)=(u-1)/n$, for all $u \in \{u<n^2 | u=1 \bmod n\}$.

As a proxy re-encryption (PRE) method, the secret key x is divided into two shares $x_1$ and $x_2$, such that $x=x_1+x_2$. The share $x_1$ is given to the proxy, while $x_2$ is stored by entity B.

The re-encryption is done by the proxy:

$$(\tilde{T},\tilde{T}')=(T,T'/T^{x_1})=(g^r,h^r(1+m*n)/(g^r)^{x_1}(\bmod\ n^2)).$$

The final decryption is done by entity B:

$$m=L(\tilde{T}'/\tilde{T}^{x_2}\bmod n^2).$$

Details of the above homomorphic re-encryption algorithm are described in, inter alia, G. Ateniese, K. Fu, M. Green, and S. Hohenberger, "Improved proxy re-encryption schemes with applications to secure distributed storage," ACM Transactions on Information and System Security (TISSEC), 2006, vol. 9, no. 1, pp. 1-30, which is incorporated herein by reference.

In the schemes of the present disclosure, the data aggregation utilizes the following characteristics of the additive homomorphic encryption functions: $E(m_1) \times E(m_2) = E(m_1 + m_2)$, where $E()$ is an encryption function with a public key pk, $m_i$ is the data to be encrypted. Because of the property of associativity, $E(m_1+m_2+\ldots+m_n)$ can be computed as $E(m_1) \times E(m_2) \times \ldots \times E(m_n)$, where $E(m_i) \neq 0$. That is, $$E(m_1+m_2+\ldots+m_n)=E(m_1) \times E(m_2) \times \ldots \times E(m_n);$$

$$E(m \times c)=E(m)^c.$$

If sk is the corresponding secret or private key of pk and $D()$ denotes the decryption function with the decryption key sk, then $$D(E(m_1) \times E(m_2) \times \ldots \times E(m_n))=m_1+m_2+\ldots+m_n;$$

$$D(E(m)^c)=m \times c,$$

where c is a constant number.

Similar to the additive homomorphic encryption, the encryption and decryption of multiplicative homomorphic encryption can be presented briefly as follows:

$$E'(m_1 \times m_2 \times \ldots \times m_n)=E'(m_1) \times E'(m_2) \times \ldots \times E'(m_n),$$

where $E'()$ is the encryption function with the public key;

$$D'(E'(m_1) \times E'(m_2) \times \ldots \times E'(m_n))=m_1 \times m_2 \times \ldots \times m_n,$$

where $D'()$ is the decryption function with the secret key.

II. The Overall System Process

Figure 2:
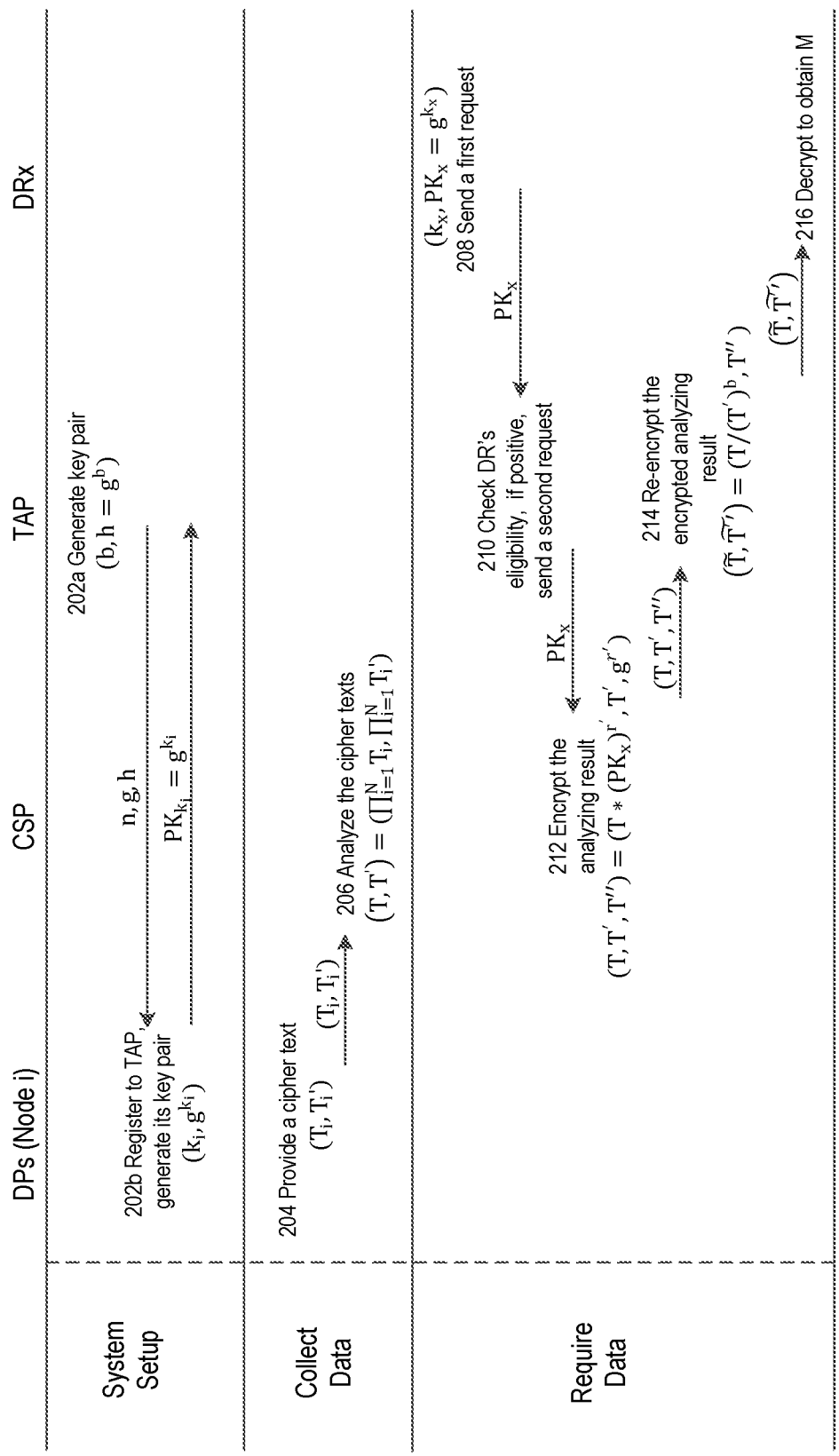
FIG. 2 depicts a flowchart of an overall system process for homomorphic re-encryption according to the second scheme of the present disclosure.
Figure 3:
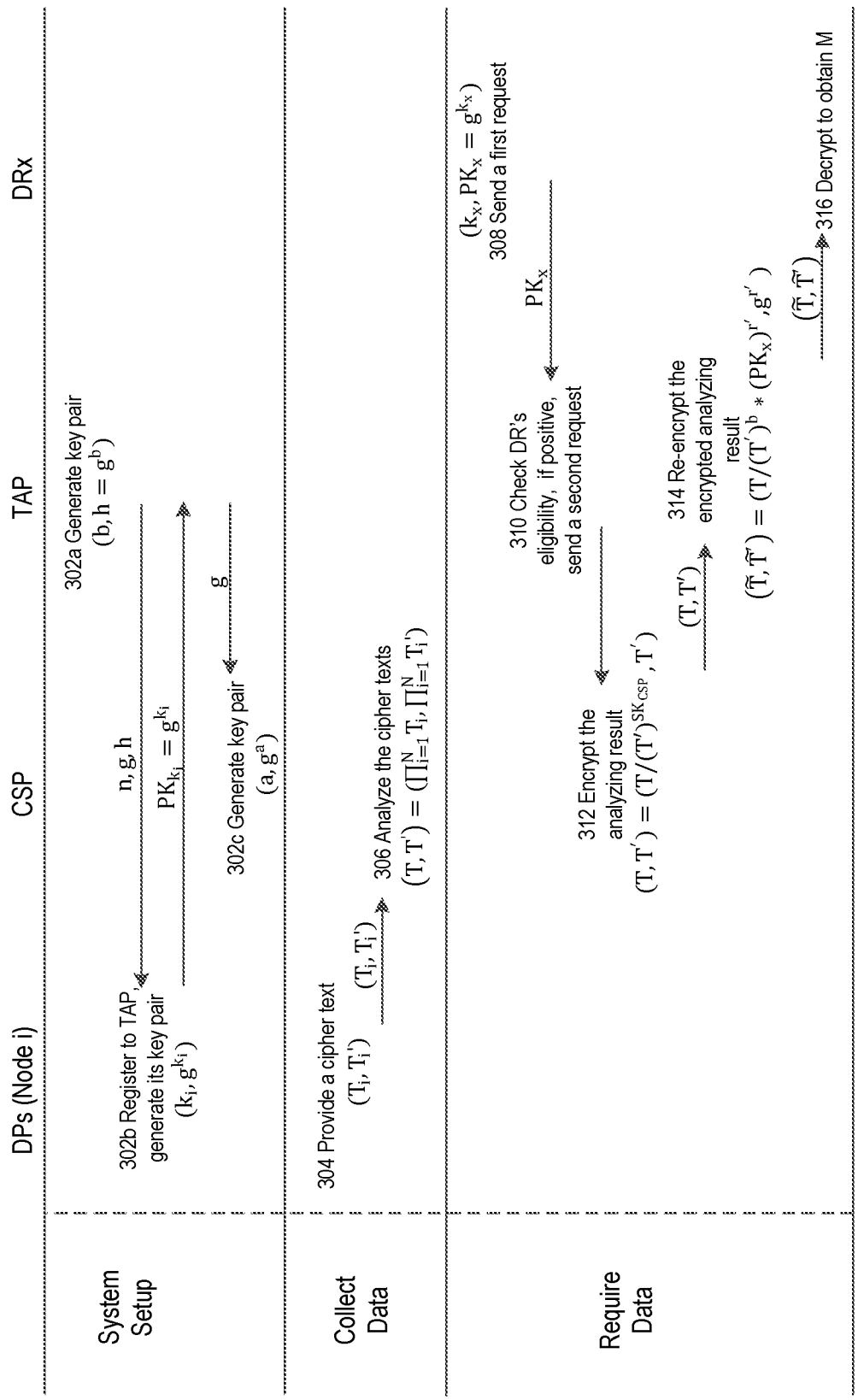
FIG. 3 depicts a flowchart of an overall system process for homomorphic re-encryption according to the third scheme of the present disclosure.

FIGS. 1-3 depict flowcharts of overall system processes for homomorphic re-encryption according to the first, second and third schemes of the present disclosure. As shown in FIGS. 1-3, the system comprises a cloud service provider (CSP), a third authorized party (TAP), a plurality of data providers (DPs) and a data requestor (DR). For the purpose of clarity, there is shown only one DR in FIGS. 1-3. However, those skilled in the art can understand that the schemes of the present disclosure are applicable for any number of DRs.

The DP may be any entity capable of providing data. As one example, the DP may provide its own data (for example, in the case where a patient provides his/her health data). In this example, the DP may comprise, but not limited to, mobile phone, tablet computer, personal digital assistant (PDA), desktop computer, laptop computer, and so on. As another example, the DP may detect/monitor/sense information of objects by interacting with the physical world in different contexts (for example, in the case of Internet of Things). In this case, the DP may comprise various things such as sensors, vehicles and so on. The DR may request for the analyzed result of a plurality of DPs' data, and may comprise, but not limited to, mobile phone, tablet computer, personal digital assistant (PDA), desktop computer, laptop computer, and so on. Apparently, an entity may act as a DP for some item of data, and at the same time, act as a DR for another item of data.

The CSP may perform data aggregation, process and analysis on the data obtained from a plurality of DPs, and may be implemented as for example a cloud computing server. The TAP is a party that doesn't collude with the CSP due to business incentive, and is trusted by the DPs. The TAP may perform further processing on the data provided by the CSP, and distribute the processed data to an authorized DR that passes the access check.

The communication network by which the CSP, the TAP, the DPs and the DR communicate with each other may include wired and/or wireless networks. These networks may include, but not limited to, a local area network (LAN), a metropolitan area network (MAN), a wide area network (WAN), a public data network (for example, the Internet), a self-organized mobile network, or any other suitable packet-switched network, such as a commercially owned, proprietary packet-switched network, for example, a proprietary cable or fiber-optic network. The wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, for example, worldwide interoperability for microwave access (WiMAX), wireless local area network (WLAN), Long Term Evolution (LTE) networks, code division multiple access (CDMA), wideband code division multiple access (WCDMA), wireless fidelity (WiFi), satellite, mobile ad-hoc network (MANET), and so on.

For ease of description, the notations used in the schemes shown in FIGS. 1-3 are summarized in the following Table 1.

TABLE 1

Notation description

| Key | Description |
|---|---|
| g | The system generator which is public |
| n | The system parameter |
| ($SK_t$, $PK_t$) | The key pair of entity t, $SK_t$ is the secret key and $PK_t$ is the public key. The subscript t may be any involved party in the system (i.e., TAP, CSP or node i). |
| ($SK_{TAP}$, $PK_{TAP}$) = (b, h = $g^b$) | The key pair of TAP, (secret key: b, public key: h = $g^b$) |
| ($SK_{CSP}$, $PK_{CSP}$) = (a, $g^a$) | The key pair of CSP, (secret key: a, public key: $g^a$) |
| ($SK_x$, $PK_x$) = ($k_x$, $h^{k_x}$) | The key pair of node x, (secret key: $k_x$, public key: $h^{k_x}$) in the first scheme |
| ($SK_x$, $PK_x$) = ($k_x$, $g^{k_x}$) | The key pair of node x, (secret key $k_x$, public key $g^{k_x}$) in the second and third schemes |
| ($T_i$, $T_i'$) | The encrypted data provided by node i, it includes two parts. |
| (T, T') | The analyzed encrypted data in CSP |
| $\tilde{T}$, $\tilde{T}'$ | The re-processed analyzed data in TAP |
| $m_i$ | The raw data provided by node i |
| M | The processed result obtained by an authorized requestor |
| N | The number of data providers |

Now the first scheme of the present disclosure will be described in detail with reference to FIG. 1. In this scheme, the DR is designated at first, and in response to the request from this designated DR, the CSP and the TAP cooperate to perform authentication, data collection, aggregation and process. It should be noted that in the schemes shown in FIGS. 1-3, data aggregation is merely taken as an exemplary example of data analyzing operation to illustrate the principle of the present disclosure, and those skilled in the art can understand that any other data analyzing operations can be applied into the present disclosure to achieve the same technical effects.

At step 102a, the TAP performs its share of the system initialization process. For example, the TAP may compute the parameter n as a product of two safe primes (i.e., n=p*q, where p=2p'+1, q=2q'+1 are safe primes), and then choose the system generator g of order $\lambda(n)=2p'q'$ by selecting a random $t \in \mathbb{Z}_n$ and computing $g=-g^{2n}$ as described above in section I. Then, the TAP may generate its key pair ($SK_{TAP}$, $PK_{TAP}$)=(b, $g^b$), where b is a random number and $b \in [1, n^2/2]$. Thereby, the parameters n, g and $h=g^b$ are generated which are public to all nodes for registration.

At step 102b, node i (i.e., a DP) performs its share of the system initialization process. This step may be performed by the node i when it registers to the TAP at the first time. Thus, a plurality of DPs may each perform step 102b at different time points. As an example, the node i may obtain the public parameters n, g and h from the TAP by sending a registration request to the TAP, and then generate its key pair ($SK_i$, $PK_i$)=($k_i$, $h^{k_i}$), where $k_i$ is a random number and $k_i \in [1, n^2/2]$. Then, the node i may register its public key $PK_i = h^{k_i}$ to the TAP. Although it is not shown in FIG. 1, node x (i.e., a DR) also performs its share of the system initialization process when it registers to the TAP at the first time, thereby obtaining its key pair ($SK_x$, $PK_x$)=($k_g$, $h^{k_x}$), where $k_x$ is a random number and $k_x \in [1, n^2/2]$.

Then, at step 104, node x (i.e., the DR) sends a first request to the TAP. The first request may be used for acquiring the analyzed (for example, aggregated) result of a plurality of DPs' data. For example, the first request may comprise information about these DPs' identifications (IDs), what data is required, and what processing is required on the data. The first request may further comprise the DR's public key ($PK_x = h^{k_x}$) which may be used for data encryption by each DP.

Then, at step 106, the TAP checks the DR's eligibility in response to the first request from the DR. This step may be implemented by using any existing technology for authenticating a user. For example, the checking operation may be based on whether the DR has paid for the request, whether the DR has signed a certain contract, or any other policies for authenticating a user. If the check result is negative (i.e., the DR has no eligibility to acquire the data), the TAP neglects the first request from the DR. On the other hand, if the check result is positive (i.e., the DR has eligibility to acquire the data), the TAP sends a second request to the CSP. In this scheme shown in FIG. 1, the second request is the same as the first request.

In response to the second request from the TAP, the CSP may determine from the second request the plurality of DPs' IDs, and send to each of these DP a third request. For example, the third request may comprise information about what data is required, which is included in the second request. The third request may further comprise the DR's public key ($PK_x = h^{k_x}$) which is included in the second request.

Then, at step 108, in response to the third request, the node i (i.e., each DP) homomorphically encrypts its data to generate its cipher text, and sends the cipher text to the CSP (for example, through a secure channel). As the first example, the node i may encrypt its data $m_i$ with the DR's public key $PK_x$ included in the third request, as shown in the equation:

$$(T_i, T_i')=((1+m_i*n)*PK_x^{r_i} \bmod n^2, g^{r_i} \bmod n^2),$$

where $r_i$ is randomly chosen by the node i and $r \in [1, n/4]$. In this example, the analyzing result obtained finally by the DR is the sum of the plurality of DPs' data.

As the second example, the node i may encrypt its data $m_i$ with the DR's public key $PK_x$, as shown in the equation:

$$(T_i, T_i')=(m_i*PK_x^{r_i} \bmod n^2, g^{r_i} \bmod n^2),$$

where $r_i$ is randomly chosen by the node i and $r \in [1, n/4]$. In this example, the analyzing result obtained finally by the DR is the product of the plurality of DPs' data.

Then, at step 110, the CSP analyzes the cipher texts, and sends the analyzing result to the TAP. For example, the CSP may compute the analyzing result as $T = \prod_{i=1}^{N} T_i$ and $T' = \prod_{i=1}^{N} T_i'$, where N is the number of the DPs indicated in the first/second request.

Then, at step 112, the TAP re-encrypts the analyzing result in such a manner that the DR can decrypt the re-encrypted analyzing result with the DR's secret key. Then, the TAP sends the re-encrypted analyzing result to the DR. For example, the TAP may re-encrypt the analyzing result (T, T') with the TAP's secret key $SK_{TAP}=b$, as shown in the equation $(\tilde{T}, \tilde{T}')=(T, (T')^b)$.

Then, at step 114, the DR decrypts the re-encrypted analyzing result with the DR's secret key. In the above first example, the DR may decrypt the re-encrypted analyzing result $(\tilde{T}, \tilde{T}')$ with its secret key $k_x$, as shown in the equation:

$$M=L(\tilde{T}/(\tilde{T}')^{k_x} \bmod n^2),$$

where $M=m_1+m_2+\ldots+m_N$, and $L(u)=(u-1)/n$. Thereby, the DR may obtain the analyzing result M (i.e., the sum of the plurality of DPs' data).

In the above second example, the DR may decrypt the re-encrypted analyzing result $(\tilde{T}, \tilde{T}')$ with its secret key $k_x$, as shown in the equation:

$$M=\tilde{T}/(\tilde{T}')^{k_x} \bmod n^2,$$

where $M=m_1*m_2*\ldots*m_N$. Thereby, the DR may obtain the analyzing result M (i.e., the product of the plurality of DPs' data).

In short, in the above first scheme, the data is processed with the public key of a designated DR. With the re-encryption at the TAP, the encrypted data can be converted to the cipher text that can only be decrypted with the secret key of the designated DR. The keys of involved parties are generated based on the public key of the TAP so that the encrypted data processing result can be further re-processed by the TAP in order to make it only decryptable by the DR.

As described above in section I, the secret key corresponding to homomorphic cryptosystem (i.e., x) is divided into two shares $x_1$ and $x_2$, such that $x=x_1+x_2$. The share $x_1$ is given to the proxy, while $x_2$ is stored by entity B. Unlike the scheme described in section I, in the above first scheme, since the DP's data is encrypted with the DR's public key $PK_x=h^{k_x}=(g^b)^{k_x}=g^{b*k_x}$, the DR's public key is generated based on the TAP's public key and the secret key corresponding to Paillier cryptosystem (i.e., x) equals to $b*k_x$. Further, in the above first scheme, there does not exist a step of dividing the secret key x into two shares. Thus, the TAP and the DR have no need to manage the key shares. They only need to hold their own secret keys. In contrast, if using the key shares, the TAP would generate as many secret keys as the number of registered users.

FIG. 2 depicts a flowchart of an overall system process for homomorphic re-encryption according to the second scheme of the present disclosure. In this scheme, The CSP collects data from various nodes all the time for potential use but with no idea about the DRs (i.e., the DR is unspecified during the data collection and analyzing). Thus, this scheme is suitable for applying into the case where multiple unspecified requestors could request the data processing result.

At step 202a, the TAP performs its share of the system initialization process. This step is similar to step 102a, and thus its description is omitted here.

At step 202b, node i (i.e., a DP) performs its share of the system initialization process. This step is similar to step 102b except that the DP's public key in this scheme is independent on the TAP's public key. Specifically, this step may be performed by the node i when it registers to the TAP at the first time. Thus, a plurality of DPs may each perform step 202b at different time points. As an example, the node i may obtain the public parameters n, g and h from the TAP by sending a registration request to the TAP, and then generate its key pair $(SK_i, PK_i) = (k_i, g^{k_i})$, where $k_i$ is a random number and $k_i \in [1, n^2/2]$. Then, the node i may register its public key $PK_i = g^{k_i}$ to the TAP. Although it is not shown in FIG. 2, node x (i.e., a DR) also performs its share of the system initialization process when it registers to the TAP at the first time, thereby obtaining its key pair $(SK_x, PK_x) = (k_g, g^{k_x})$, where $k_x$ is a random number and $k_x \in [1, n^2/2]$.

Then, at step 204, the node i (i.e., each DP) homomorphically encrypts its data to generate its cipher text, and sends the cipher text to the CSP (for example, through a secure channel). The node i may send its cipher text actively or in response to a request from the CSP. As the first example, the node i may encrypt its data $m_i$ with the TAP's public key $PK_{TAP} = h = g^b$ obtained in step 202b, as shown in the equation:

$$(T_i, T_i') = ((1 + m_i * n) * PK_{TAP}{}^{r_i} \mod n^2, g^{r_i} \mod n^2),$$

where $r_i$ is randomly chosen by the node i and $r \in [1, n/4]$. In this example, the analyzing result obtained finally by the DR is the sum of a plurality of DPs' data.

As the second example, the node i may encrypt its data $m_i$ with the TAP's public key $PK_{TAP} = h = g^b$, as shown in the equation:

$$(T_i, T_i') = (m_i * PK_{TAP}{}^{r_i} \mod n^2, g^{r_i} \mod n^2),$$

where $r_i$ is randomly chosen by the node i and $r \in [1, n/4]$. In this example, the analyzing result obtained finally by the DR is the product of a plurality of DPs' data.

Then, at step 206, the CSP analyzes the cipher texts. For example, the CSP may compute the analyzing result as $T = \Pi_{i=1}^{N} T_i$ and $T' = \Pi_{i=1}^{N} T_i'$, where N is the number of the DPs. The analyzing result may be stored at the CSP.

Then, at step 208, node x (i.e., the DR) sends a first request to the TAP. The first request may be used for acquiring the analyzed (for example, aggregated) result of a plurality of DPs' data. For example, the first request may comprise information about these DPs' identifications (IDs), what data is required, and what processing is required on the data. The first request may further comprise the DR's public key $(PK_x = g^{k_x})$ which may be used for data encryption by the CSP.

Then, at step 210, the TAP checks the DR's eligibility in response to the first request from the DR. This step may be implemented by using any existing technology for authenticating a user. For example, the checking operation may be based on whether the DR has paid for the request, whether the DR has signed a certain contract, or any other policies for authenticating a user. If the check result is negative (i.e., the DR has no eligibility to acquire the data), the TAP neglects the first request from the DR. On the other hand, if the check result is positive (i.e., the DR has eligibility to acquire the data), the TAP sends a second request to the CSP. In this scheme shown in FIG. 2, the second request is the same as the first request.

Then, at step 212, the CSP encrypts the analyzing result in response to the second request from the TAP, and sends the encrypted analyzing result to the TAP. In this scheme, it is assumed that the DR requests for the analyzed (for example, aggregated) result of all the DPs that have provided their data to the CSP during the data collection. However, it is also possible that the DR only requests for the analyzed (for example, aggregated) result of a subset of all the DPs. In this case, the CSP may store the cipher texts of respective DPs' data during the data collection, and analyze the cipher texts of the subset according to the DR's request.

For example, the CSP may encrypt the analyzing result (T, T') with the DR's public key $PK_x$ included in the second request, by computing $T = T*(PK_x)^{r'}$ and adding one more item $T'' = g^{r'}$, where r' is randomly chosen by the CSP and $r' \in [1, n/4]$. Thereby, the encrypted analyzing result is (T, T', T'').

Then, at step 214, the TAP re-encrypts the encrypted analyzing result in such a manner that the DR can decrypt the re-encrypted analyzing result with the DR's secret key. For example, the TAP may re-encrypt the analyzing result (T, T', T'') with the TAP's secret key $SK_{TAP} = b$, as shown in the equation:

$$(\tilde{T}, \tilde{T}', \widetilde{T''}) = (T/(T')^b, T', T'').$$

Then, the TAP sends the re-encrypted analyzing result $(\tilde{T}, \widetilde{T''})$ to the DR.

Then, at step 216, the DR decrypts the re-encrypted analyzing result with the DR's secret key. In the above first example, the DR may decrypt the re-encrypted analyzing result $(\tilde{T}, \widetilde{T''})$ with its secret key $k_x$, as shown in the equation:

$$M = L(\tilde{T}/(\widetilde{T''})^{k_x} \mod n^2),$$

where $M = m_1 + m_2 + \ldots + m_N$, and $L(u) = (u-1)/n$. Thereby, the DR may obtain the analyzing result M (i.e., the sum of the plurality of DPs' data).

In the above second example, the DR may decrypt the re-encrypted analyzing result $(\tilde{T}, \widetilde{T''})$ with its secret key $k_x$, as shown in the equation:

$$M = \tilde{T}/(\widetilde{T''})^{k_x} \mod n^2,$$

where $M = m_1 * m_2 * \ldots * m_N$. Thereby, the DR may obtain the analyzing result M (i.e., the product of the plurality of DPs' data).

In short, in the above second scheme, the raw data are encrypted with the public key of the TAP and the encrypted data are analyzed and stored in the CSP. When a DR wants to access the analyzing result, the TAP checks the eligibility of the DR. If the check result is positive, the TAP further processes the encrypted analyzing result together with the CSP in order to make it decryptable by the authorized DR with its secret key (a secret only known by the authorized DR). The unspecified DR can obtain the analyzing result with its own secret key, which makes the key management simplified.

In the above second scheme, since the DP's data is encrypted with the TAP's public key $PK_{TAP}=g^b$ at first and then with the DR's public key $PK_x=g^{k_x}$, the re-encryption by the TAP may also be deemed as partially decrypting the analyzing result (T, T', T") with its secret key $SK_{TAP}=b$, and the decryption by the DR may also be deemed as completely decrypting the analyzing result ($\tilde{T}$, $\widetilde{T''}$) with its secret key $SK_x=k_x$.

FIG. 3 depicts a flowchart of an overall system process for homomorphic re-encryption according to the third scheme of the present disclosure. Similarly to the above second scheme, in this scheme, the CSP collects data from various nodes all the time, and the DR is unspecified during the data collection and aggregation. Thus, this scheme is suitable for applying into the case where multiple unspecified requestors could request the data processing result. The difference between the second and third schemes lies in that the third scheme is proposed in view of the fact that in some scenarios, there exists a trusted server which is allowed to access the analyzed result but not the provided raw data. In this scheme, the TAP is assumed to be fully trusted to be able to access the analyzed result.

At step 302a, the TAP performs its share of the system initialization process. This step is similar to step 102a, and thus its description is omitted here. At step 302b, node i (i.e., a DP) performs its share of the system initialization process. This step is similar to step 102b, and thus its description is omitted here. Although it is not shown in FIG. 3, node x (i.e., a DR) also performs its share of the system initialization process when it registers to the TAP at the first time, thereby obtaining its key pair $(SK_x, PK_x)=(k_g, g^{k_x})$, where $k_x$ is a random number and $k_x \in [1, n^2/2]$.

At step 302c, the CSP performs its share of the system initialization process. For example, the CSP may obtain the parameter g from the TAP by for example sending a request to the TAP. Then, the CSP may generate its key pair $(SK_{CSP}, PK_{CSP})=(a, g^a)$, where a is a random number and $a \in [1, n^2/2]$. The CSP's public key $PK_{CSP}=g^a$ may be for example distributed to each DP after the CSP has finished its share of the system initialization process. It is also possible that the CSP and the TAP together complete their shares of the system initialization process, and the CSP's public key may be shared between the CSP and the TAP, and then be provided from the TAP to each DP together with the public parameters n, g and h. However, the present disclosure is not so limited, and the CSP's public key may be provided to each DP in any suitable manners.

Then, at step 304, the node i (i.e., each DP) homomorphically encrypts its data to generate its cipher text, and sends the cipher text to the CSP (for example, through a secure channel). The node i may send its cipher text actively or in response to a request from the CSP. As the first example, the node i may encrypt its data $m_i$ with the TAP's public key $(PK_{TAP}=h=g^b)$ obtained in step 202b and the CSP's public key $(PK_{CSP}=g^a)$, as shown in the equation:

$$(T_i, T_i') = ((1+m_i*n)*PK_{TAP}^{r_i}*PK_{CSP}^{r_i \bmod n^2}, g^{r_i} \bmod n^2),$$

where $r_i$ is randomly chosen by the node i and $r \in [1, n/4]$. In this example, the analyzing result obtained finally by the DR is the sum of a plurality of DPs' data.

As the second example, the node i may encrypt its data $m_i$ with the TAP's public key $(PK_{TAP}=h=g^b)$ and the CSP's public key $(PK_{CSP}=g^a)$, as shown in the equation:

$$(T_i, T_i') = (m_i*PK_{TAP}^{r_i}*PK_{CSP}^{r_i} \bmod n^2, g^{r_i} \bmod n^2),$$

where $r_i$ is randomly chosen by the node i and $r \in [1, n/4]$. In this example, the analyzing result obtained finally by the DR is the product of a plurality of DPs' data.

Then, at step 306, the CSP analyzes the cipher texts. For example, the CSP may compute the analyzing result as $T=\Pi_{i=1}^{N} T_i$ and $T'=\Pi_{i=1}^{N} T_i'$, where N is the number of the DPs. The analyzing result may be stored at the CSP.

Then, at step 308, node x (i.e., the DR) sends a first request to the TAP. The first request may be used for acquiring the analyzed (for example, aggregated) result of a plurality of DPs' data. For example, the first request may comprise information about these DPs' identifications (IDs), what data is required, and what processing is required on the data. The first request may further comprise the DR's public key $(PK_x=g^{k_x})$ which may be used for data encryption by the TAP.

Then, at step 310, the TAP checks the DR's eligibility in response to the first request from the DR. This step may be implemented by using any existing technology for authenticating a user. For example, the checking operation may be based on whether the DR has paid for the request, whether the DR has signed a certain contract, or any other policies for authenticating a user. If the check result is negative (i.e., the DR has no eligibility to acquire the data), the TAP neglects the first request from the DR. On the other hand, if the check result is positive (i.e., the DR has eligibility to acquire the data), the TAP sends a second request to the CSP. In this scheme shown in FIG. 3, the second request is basically the same as the first request except that the second request does not comprise the DR's public key $(PK_x=g^{k_x})$.

Then, at step 312, the CSP encrypts the analyzing result in response to the second request from the TAP, and sends the encrypted analyzing result to the TAP. In this scheme, it is assumed that the DR requests for the analyzed (for example, aggregated) result of all the DPs that have provided their data to the CSP during the data collection. However, it is also possible that the DR only requests for the analyzed (for example, aggregated) result of a subset of all the DPs. In this case, the CSP may store the cipher texts of respective DPs' data during the data collection, and analyze the cipher texts of the subset according to the DR's request.

For example, the CSP may encrypt the analyzing result (T, T') with the CSP's secret key $SK_{CSP}=a$, by computing $\hat{T}=T/(T')^{SK_{CSP}}$. Thereby, the encrypted analyzing result is $(\hat{T}, T')=(T/(T')^{SK_{CSP}}, T')$.

Then, at step 314, the TAP re-encrypts the encrypted analyzing result in such a manner that the DR can decrypt the re-encrypted analyzing result with the DR's secret key. For example, the TAP may re-encrypt the analyzing result (T, T') with the TAP's secret key $SK_{TAP}=b$ and the DR's public key $PK_x$ included in the first request, as shown in the equation:

$$(\tilde{T}, \tilde{T}') = (T/(T')^b * (PK_x)^{r'}, g^{r'}),$$

where r' is randomly chosen by the TAP and $r' \in [1, n/4]$. Then, the TAP sends the re-encrypted analyzing result $(\tilde{T}, \tilde{T}')$ to the DR.

Then, at step 316, the DR decrypts the re-encrypted analyzing result with the DR's secret key. In the above first example, the DR may decrypt the re-encrypted analyzing result $(\tilde{T}, \tilde{T}')$ with its secret key $k_x$, as shown in the equation:

$$M = L(\tilde{T}/(\tilde{T}')^{k_x} \bmod n^2),$$

where $M=m_1+m_2+\ldots+m_N$, and $L(u)=(u-1)/n$. Thereby, the DR may obtain the analyzing result M (i.e., the sum of the plurality of DPs' data).

In the above second example, the DR may decrypt the re-encrypted analyzing result (T̃, T̃') with its secret key $k_x$, as shown in the equation:

$$M = \tilde{T}'/(\tilde{T})^{k_x} \bmod n^2),$$

where $M = m_1 * m_2 * \ldots * m_N$. Thereby, the DR may obtain the analyzing result M (i.e., the product of the plurality of DPs' data).

In this scheme, the TAP may optionally save the encrypted analyzing result received from the CSP. Thereby, in response to a third request from another DR for acquiring the same analyzing result as requested by the DR, the TAP may check the another DR's eligibility as described above in step 310. If the check result is negative (i.e., the other DR has no eligibility to acquire the analyzing result), the TAP may neglect the third request.

On the other hand, if the check result is positive (i.e., the another DR has eligibility to acquire the analyzing result), the TAP may re-encrypt the saved encrypted analyzing result with the TAP's secret key and the another DR's public key included in the third request, such that the another DR can decrypt the re-encrypted analyzing result with the another DR's secret key. This step may be similar to step 314 as described above. Then, the TAP may send the re-encrypted analyzing result to the other DR.

In this way, compared with the above second scheme, the third scheme makes the TAP be able to access the final analyzed result while saving communication cost. This is because the TAP has no need to forward to the CSP the requests for acquiring the same analyzing result from any other authorized requestors. In general, the third scheme can save more data processing time and communication cost.

In short, the above third scheme is an optional protocol based on the second scheme aiming to save communication cost by applying a trusted server. In the above third scheme, since the DP's data is encrypted with the TAP's public key $PK_{TAP} = g^b$ and the CSP's public key $PK_{CSP} = g^a$ at first and then with the CSP's secret key $SK_{CSP} = a$, the encryption by the CSP may also be deemed as partially decrypting the analyzing result (T, T') with its secret key $SK_{CSP} = a$, and the re-encryption by the TAP may also be deemed as a combination of two processes, one of which is encrypting the analyzing result (T, T') with the DR's public key $PK_x = g^{k_x}$, and the other of which is partially decrypting the analyzing result (T, T') with the TAP's secret key $SK_{TAP} = b$. The decryption by the DR may also be deemed as completely decrypting the analyzing result (T̃, T̃') with its secret key $SK_x = k_x$.

The above three schemes shown in FIGS. 1-3 may typically be applied into Internet of Things (IoT) systems to support IoT data process and analysis with privacy preservation. In this case, a number of Things collect data and send to the CSP in an encrypted form for processing, the CSP processes the collected encrypted data. If there is any request on the processing result, the TAP and CSP will check the eligibility of the requestor and perform homomorphic re-encryption to allow the encrypted result to be only accessible by eligible requestors.

III. The Processes at Individual Parties

Figure 4:
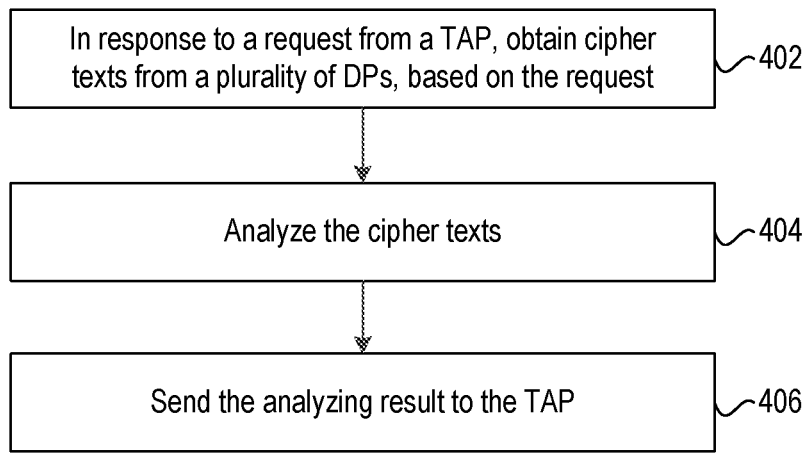
FIG. 4 shows a flowchart of a process implemented at a cloud service provider (CSP) according to an embodiment of the present disclosure.

FIG. 4 shows a flowchart of a process implemented at a cloud service provider (CSP) according to an embodiment of the present disclosure. This embodiment corresponds to the first scheme shown in FIG. 1. At step 402, in response to a request from the TAP, the CSP obtains from a plurality of DPs cipher texts of their respective data, based on the request, wherein each DP is able to homomorphically encrypt its data. The request may comprise the DR's public key, and each DP is able to homomorphically encrypt its data with the DR's public key. Step 402 may be implemented as described above with respect to steps 106 to 108 of FIG. 1.

Then, at step 404, the CSP analyzes the cipher texts. For example, the CSP may aggregate the cipher texts. Step 404 may be implemented as step 110 of FIG. 1.

Then, at step 406, the CSP sends the analyzing result to the TAP, wherein the TAP is able to re-encrypt the analyzing result, such that a DR can decrypt the re-encrypted analyzing result with the DR's secret key. For example, the TAP may re-encrypt the analyzing result with the TAP's secret key. The decrypted analyzing result generated by the DR may comprise a sum or a product of the plurality of DPs' data.

Figure 5:
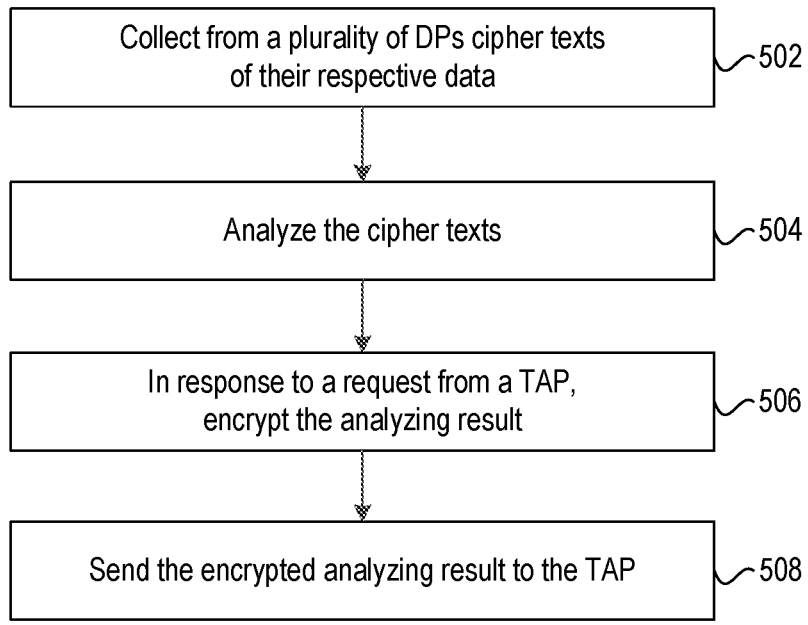
FIG. 5 shows a flowchart of a process implemented at a CSP according to another embodiment of the present disclosure.

FIG. 5 shows a flowchart of a process implemented at a CSP according to another embodiment of the present disclosure. This embodiment corresponds to the second and third schemes shown in FIGS. 2 and 3. At step 502, the CSP collects from a plurality of DPs cipher texts of their respective data, wherein each DP is able to homomorphically encrypt its data. As the first example, each DP is able to homomorphically encrypt its data with the TAP's public key. As the second example, each DP is able to homomorphically encrypt its data with the TAP's public key and the CSP's public key. Step 502 may be implemented as step 204 of FIG. 2 or step 304 of FIG. 3.

Then, at step 504, the CSP analyzes the cipher texts. For example, the CSP may aggregate the cipher texts. Step 504 may be implemented as step 206 of FIG. 2 or step 306 of FIG. 3.

Then, at step 506, in response to a request from a TAP, the CSP encrypts the analyzing result. In the above first example, the request may comprise the DR's public key, and the CSP may encrypt the analyzing result with the DR's public key. In the above second example, the CSP may encrypt the analyzing result with the CSP's secret key. Step 506 may be implemented as step 212 of FIG. 2 or step 312 of FIG. 3.

Then, at step 508, the CSP sends the encrypted analyzing result to the TAP, wherein the TAP is able to re-encrypt the encrypted analyzing result, such that a DR can decrypt the re-encrypted analyzing result with the DR's secret key. In the above first example, the TAP may re-encrypt the encrypted analyzing result with the TAP's secret key. In the above second example, the TAP may re-encrypt the encrypted analyzing result with the TAP's secret key and the DR's public key. The decrypted analyzing result generated by the DR may comprise a sum or a product of the plurality of DPs' data.

Figure 6:
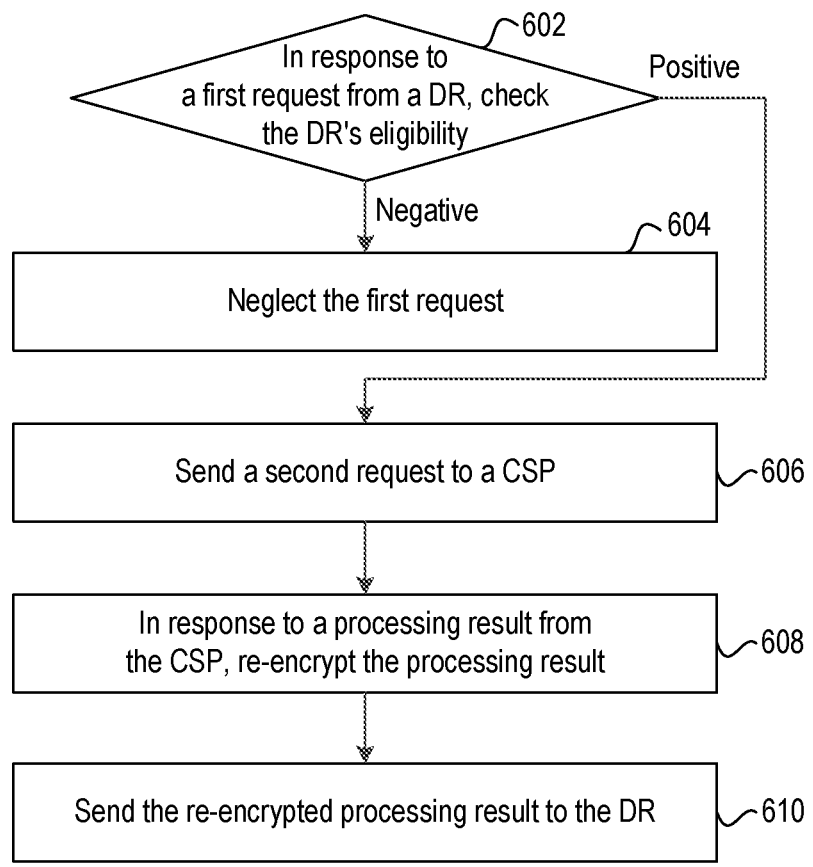
FIG. 6 shows a flowchart of a process implemented at a third authorized party (TAP) according to an embodiment of the present disclosure.

FIG. 6 shows a flowchart of a process implemented at a third authorized party (TAP) according to an embodiment of the present disclosure. At step 602, in response to a first request from a DR, the TAP checks the DR's eligibility. If the check result is negative, the TAP neglects the first request at step 604. On the other hand, if the check result is positive, the TAP sends a second request to a CSP at step 606, wherein the CSP is able to process cipher texts obtained from a plurality of DPs, and each DP is able to homomorphically encrypt its data. Steps 602-606 may be implemented as step 106 of FIG. 1, step 210 of FIG. 2 or step 310 of FIG. 3.

As the first example, the first request may comprise the DR's public key, and the second request may be the same as the first request. The CSP may obtain the cipher texts based on the second request, and analyze the cipher texts, and each DP is able to homomorphically encrypt its data with the DR's public key included in the second request.

As the second example, the first request may comprise the DR's public key, and the second request may be the same as the first request. The CSP may obtain and analyze the cipher texts prior to the first request, and encrypt the analyzing result with the DR's public key included in the second request, and each DP is able to homomorphically encrypt its data with the TAP's public key.

As the third example, the first request may comprise the DR's public key, and the second request may be the first request excluding the DR's public key. The CSP may obtain and analyze the cipher texts prior to the first request, and encrypt the analyzing result with the CSP's secret key in response to the second request, and each DP is able to homomorphically encrypt its data with the TAP's public key and the CSP's public key.

Then, at step 608, in response to the processing result from the CSP, the TAP re-encrypts the processing result, such that the DR can decrypt the re-encrypted processing result with the DR's secret key. In the above first and second examples, the TAP may re-encrypt the analyzing result with the TAP's secret key. In the above third example, the TAP may re-encrypt the encrypted analyzing result with the TAP's secret key and the DR's public key included in the first request. Step 608 may be implemented as step 112 of FIG. 1, step 214 of FIG. 2 or step 314 of FIG. 3. Then, at step 610, the TAP sends the re-encrypted processing result to the DR.

Figure 7:
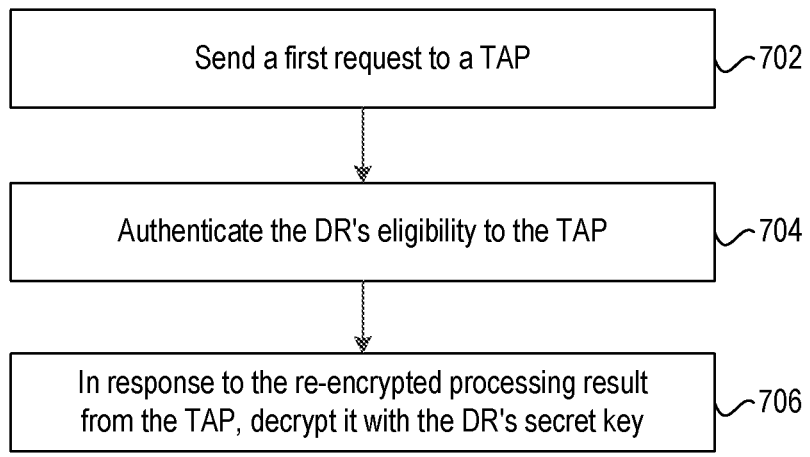
FIG. 7 shows a flowchart of a process implemented at a data requestor (DR) according to an embodiment of the present disclosure.

FIG. 7 shows a flowchart of a process implemented at a data requestor (DR) according to an embodiment of the present disclosure. At step 702, the DR sends a first request to a TAP. This step may be implemented as step 104 of FIG. 1, step 208 of FIG. 2 or step 308 of FIG. 3.

Then, at step 704, the DR authenticates the DR's eligibility to the TAP, wherein the TAP is able to send a second request to a CSP in response to a positive authentication result, the CSP is able to process cipher texts obtained from a plurality of data providers (DPs), each DP is able to homomorphically encrypt its data, and the TAP is able to re-encrypt the processing result. Step 704 may be implemented as described above with respect to step 106 of FIG. 1, step 210 of FIG. 2 or step 310 of FIG. 3.

Then, at step 706, in response to the re-encrypted processing result from the TAP, the DR decrypts the re-encrypted processing result with the DR's secret key. This step may be implemented as step 114 of FIG. 1, step 216 of FIG. 2 or step 316 of FIG. 3.

Figure 8:
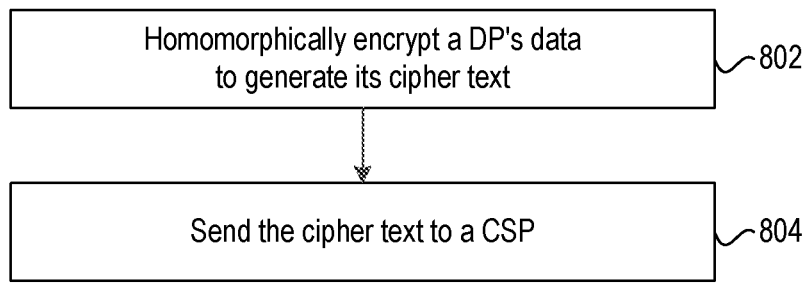
FIG. 8 shows a flowchart of a process implemented at a data provider (DP) according to an embodiment of the present disclosure.

FIG. 8 shows a flowchart of a process implemented at a data provider (DP) according to an embodiment of the present disclosure. At step 802, the DP homomorphically encrypts the DP's data to generate its cipher text. As the first example, in response to a first request from the CSP, the DP may homomorphically encrypt the DP's data with the DR's public key included in the first request. As the second example, the DP may homomorphically encrypt the DP's data with the TAP's public key. As the third example, the DP may homomorphically encrypt the DP's data with the TAP's public key and the CSP's public key. Step 802 may be implemented as described above with respect to step 108 of FIG. 1, step 204 of FIG. 2 or step 304 of FIG. 3.

Then, at step 804, the DP sends the cipher text to a CSP, wherein the CSP is able to process cipher texts obtained from a plurality of DPs, and a TAP is able to re-encrypt the processing result, such that a DR can decrypt the re-encrypted processing result with the DR's secret key. In the above first example, the CSP may analyze the cipher texts, and the TAP is able to re-encrypt the analyzing result with the TAP's secret key. In the above second example, the CSP may analyze the cipher texts, and in response to a second request from the TAP, encrypt the analyzing result with the DR's public key included in the second request. The TAP may re-encrypt the encrypted analyzing result with the TAP's secret key. In the above third example, the CSP may analyze the cipher texts, and in response to a second request from the TAP, encrypt the analyzing result with the CSP's secret key. The TAP may re-encrypt the encrypted analyzing result with the TAP's secret key and the DR's public key.

IV. The System Structure

Figure 9:
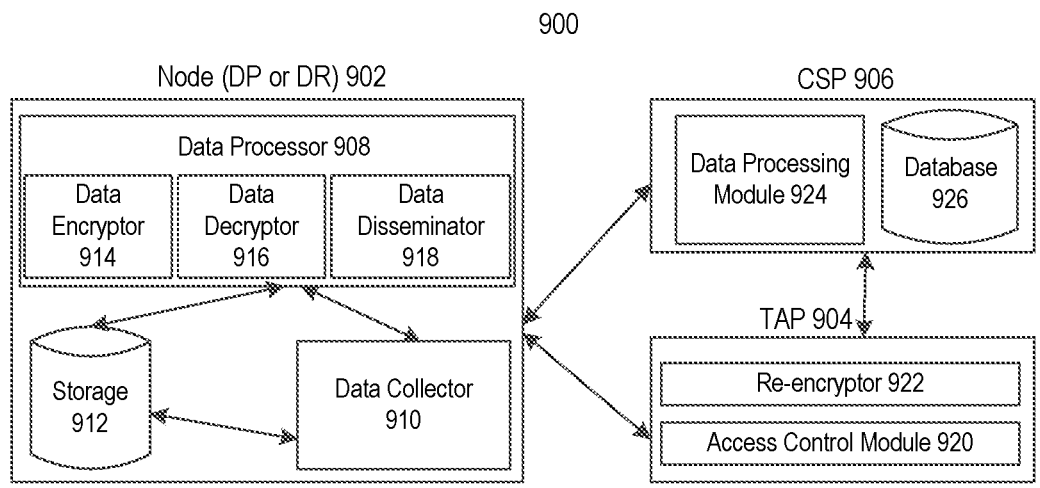
FIG. 9 shows an exemplary system into which at least one embodiment of the present disclosure may be applied.

FIG. 9 shows an exemplary system into which at least one embodiment of the present disclosure may be applied. As shown in FIG. 9, the system 900 may comprise a plurality of nodes 902, a CSP 906 and a TAP 904. The node 902 may act as a DP or a DR. When acting as a DP, the node 902 may include a data processor 908, a data collector 910 and a storage 912, wherein the data processor 908 may at least include a data encryptor 914 and a data disseminator 918. The data collector 910 may collect information of objects by interacting with the physical world in different contexts. The storage 912 may store the collected information. The data encryptor 914 may be configured to perform step 802 of FIG. 8. The data disseminator 918 may be configured to perform step 804 of FIG. 8.

Further, when acting as a DR, the node 902 may include a data processor 908 and a storage 912, wherein the data processor 908 may at least include a data decryptor 916 and a data disseminator 918. The data disseminator 918 may be configured to perform steps 702 and 704 of FIG. 7. The data decryptor 916 may be configured to perform step 706 of FIG. 7. The storage 912 may store the decrypted data. Apparently, it is also possible that the node is able to act as both a DP and a DR. In this case, the node 902 may include all the components 908-918.

The CSP 906 may include a data processing module 924 and a database 926. The data processing module 924 may be configured to perform steps 402-406 of FIG. 4 and steps 502-508 of FIG. 5. The database 926 may save the analyzing result. The TAP 904 may include an access control module 920 and a re-encryptor 922. The access control module 920 may be configured to perform steps 602-606 and 610 of FIG. 6. The re-encryptor 922 may be configured to perform step 608 of FIG. 6.

The system 900 may be for example a PSN (Pervasive Social Networking) system. In this case, the node 902 may further include a social communication module that is responsible for social communications. It should be noted that the system structure shown in FIG. 9 is just an exemplary example, and thus it may be modified by those skilled in the art as needed.

Based on the above description, the following advantageous technical effects can be achieved by the present disclosure:

(1) Compared with the scheme for data process using Fully Homomorphic Encryption (FHE), the first scheme of the present disclosure can make sure that only the designated requestor can obtain the processing result, even if the CSP colludes with the requestor. This scheme achieves lower computation complexity than existing schemes based on FHE. The cooperation without collusion between the CSP and the TAP can make sure that only the final processing data is obtained by the authorized requestor and that information about the providers cannot be revealed.

(2) The most outstanding advantage of the second scheme is that it makes the processing result available to any authorized requestor who could be unknown before data collection. Moreover, the processing result cannot be known by any other involved parties including the CSP and the TAP. The random numbers chosen by the DPs to encrypt the raw data ensure that the data stored at the CSP would not be revealed. The random chosen by the CSP before sending encrypted analyzing result to the TAP can protect the data from the TAP. As the TAP and the SCP have no collusion, the final results can only be obtained by the authorized requestors without revealing to the other involved parties.

Although this scheme has higher computation cost at the CSP, this is completely acceptable since the computation resources of cloud servers are sufficient. The extra communication cost introduced by the scheme is acceptable, especially in the optional design.

(3) As an optional protocol of the second scheme, the third scheme has a lower communication cost. The more requestors, the more communication costs it saves. Once it has acquired the processing result from the CSP, the TAP has no need to communicate with the CSP again for providing the same processing result. However, TAP should be fully trusted in order to make the final processing result be disclosed to it.

Figure 10:
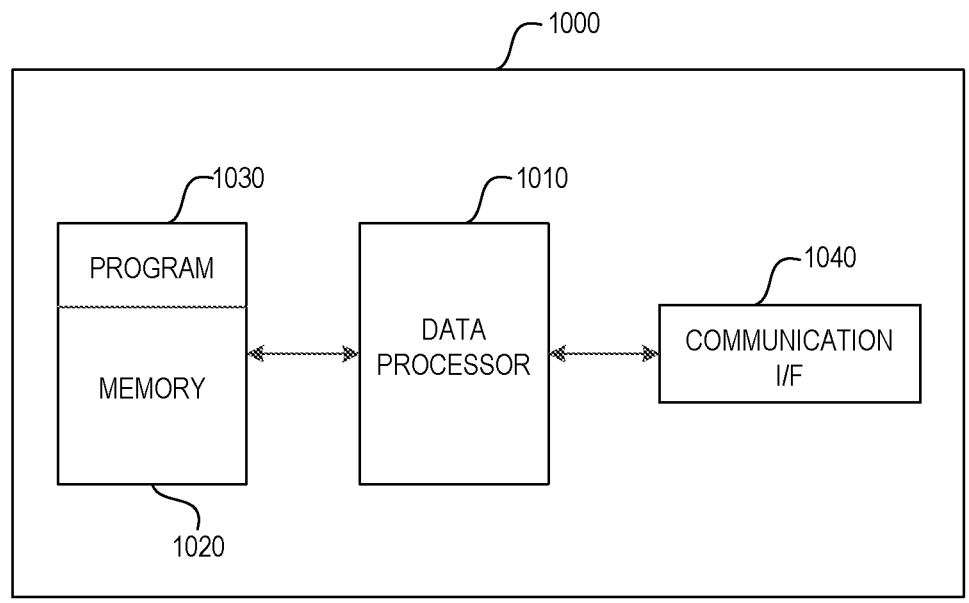
FIG. 10 is a simplified block diagram showing an apparatus that is suitable for use in practicing some embodiments of the present disclosure.

FIG. 10 is a simplified block diagram showing an apparatus that is suitable for use in practicing some exemplary embodiments of the present disclosure. For example, any one of the node, the CSP and the TAP may be implemented through the apparatus 1000. As shown, the apparatus 1000 may include a data processor 1010, a memory 1020 that stores a program 1030, and a communication interface 1040 for communicating data with other external devices through wired and/or wireless communication.

The program 1030 is assumed to include program instructions that, when executed by the data processor 1010, enable the apparatus 1000 to operate in accordance with the embodiments of this disclosure, as discussed above. That is, the embodiments of this disclosure may be implemented at least in part by computer software executable by the data processor 1010, or by hardware, or by a combination of software and hardware.

The memory 1020 may be of any type suitable to the local technical environment and may be implemented using any suitable data storage technology, such as semiconductor based memory devices, flash memory, magnetic memory devices and systems, optical memory devices and systems, fixed memory and removable memory. The data processor 1010 may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. An apparatus implemented at a cloud service provider, comprising:
   at least one processing core, and
   at least one memory including computer program code,
   the at least one memory and the computer program code being configured to, with the at least one processing core, cause the apparatus at least to:
   in response to a request from a third authorized party, obtain from a plurality of data providers (DPs) cipher texts of their respective data, based on the request, wherein each data provider is configured to homomorphic ally encrypt its data;
   analyze the cipher texts to obtain an analyzed result; and
   send the analyzed result to the third authorized party, wherein the third authorized party is configured to re-encrypt the analyzed result with at least a secret key of the third authorized party, such that a data requestor (DR) is configured to decrypt the re-encrypted analyzed result with a secret key of the data requestor, wherein the cloud service provider, the third authorized party, the plurality of data providers, and the data requestor are separate entities,
   wherein the re-encryption is based on a proxy re-encryption (PRE) scheme where a secret key corresponding to the homomorphic encryption is a product of the secret key of the third authorized party and the secret key of the data requestor.

2. The apparatus according to claim 1, wherein the request comprises a public key of the data requestor, and each data provider is configured to homomorphically encrypt its data with the public key of the data requestor.

3. The apparatus according to claim 1, wherein the analysis of the cipher texts further comprises: aggregating the cipher texts; and
wherein the decrypted analyzed result comprises a sum or a product of the plurality of data providers' data.

4. The apparatus according to claim 1, wherein the homomorphic encryption is based on Paillier cryptosystem.

5. An apparatus implemented at a cloud service provider, comprising:
at least one processing core, and
at least one memory including computer program code,
the at least one memory and the computer program code being configured to, with the at least one processing core, cause the apparatus at least to:
collect from a plurality of data providers cipher texts of their respective data, wherein each data provider is configured to homomorphically encrypt its data;
analyze the cipher texts to obtain an analyzed result;
in response to a request from a third authorized party, encrypt the analyzed result; and
send the encrypted analyzed result to the third authorized party, wherein the third authorized party is configured to re-encrypt the encrypted analyzed result with at least a secret key of the third authorized party, such that a data requestor is configured to decrypt the re-encrypted analyzed result with a secret key of the data requestor, wherein the cloud service provider, the third authorized party, the plurality of data providers, and the data requestor are separate entities, wherein the re-encryption is based on a proxy re-encryption (PRE) scheme where a secret key corresponding to the homomorphic encryption is a product of the secret key of the third authorized party and the secret key of the data requestor.

6. The apparatus according to claim 5, wherein each data provider is configured to homomorphically encrypt its data with a public key of the third authorized party;
wherein the request comprises a public key of the data requestor, and the encryption further comprises: encrypting the analyzed result with the public key of the data requestor.

7. The apparatus according to claim 5, wherein each data provider is configured to homomorphically encrypt its data with a public of the third authorized party and a public key of the cloud service provider;
wherein the encryption further comprises: encrypting the analyzed result with the secret key of the cloud service provider; and
wherein the third authorized party is configured to re-encrypt the encrypted analyzed result with the secret key of the third authorized party and a public key of the data requestor.

8. The apparatus according to claim 5, wherein the analysis of the cipher texts further comprises: aggregating the cipher texts; and
wherein the decrypted analyzed result comprises a sum or a product of the plurality of data providers' data.

9. The apparatus according to claim 5, wherein the homomorphic encryption is based on Paillier cryptosystem.

10. An apparatus implemented at a third authorized party, comprising:
at least one processing core, and
at least one memory including computer program code,
the at least one memory and the computer program code being configured to, with the at least one processing core, cause the apparatus at least to:
in response to a first request from a data requestor, check the data requestor's eligibility;
in response to a negative check result, neglect the first request;
in response to a positive check result, send a second request to a cloud service provider, wherein the cloud service provider is configured to process cipher texts obtained from a plurality of data providers to obtain a processed result, and each data provider is configured to homomorphically encrypt its data;
in response to the processed result from the cloud service provider, re-encrypt the processed result with at least a secret key of the third authorized party, such that the data requestor is configured to decrypt the re-encrypted processed result with a secret key of the data requestor; and
send the re-encrypted processed result to the data requestor, wherein the cloud service provider, the third authorized party, the plurality of data providers, and the data requestor are separate entities,
wherein the re-encryption is based on a proxy re-encryption (PRE) scheme where a secret key corresponding to the homomorphic encryption is a product of the secret key of the third authorized party and the secret key of the data requestor.

11. The apparatus according to claim 10, wherein the first request comprises a public key of the data requestor, and the second request is the same as the first request;
wherein the cloud service provider is configured to obtain the cipher texts based on the second request, and analyze the cipher texts, and each data provider is configured to homomorphically encrypt its data with the public key of the data requestor included in the second request; and
wherein the re-encryption of the processed result further comprises: re-encrypting the analyzed result with a secret key of the third authorized party.

12. The apparatus according to claim 10, wherein the first request comprises a public key of the data requestor, and the second request is the same as the first request;
wherein the cloud service provider is configured to obtain and analyze the cipher texts prior to the first request, and encrypt the analyzed result with the public key of the data requestor included in the second request, and each data provider is configured to homomorphically encrypt its data with a public key of the third authorized party's public key; and
wherein the re-encryption of the processed result further comprises: re-encrypting the encrypted processed result with a secret key of the third authorized party.

13. The apparatus according to claim 10, wherein the first request comprises a public key of the data requestor, and the second request is the first request excluding the public key of the data requestor;
wherein the cloud service provider is configured to obtain and analyze the cipher texts prior to the first request, and encrypt the analyzed result with a secret key of the cloud service provider in response to the second request, and each data provider is configured to homomorphically encrypt its data with a public key of the third authorized party and a public key of the cloud service provider; and
wherein the re-encryption of the process result further comprises: re-encrypting the encrypted analyzed result with the secret key of the third authorized party and the public key of the data requestor included in the first request.

14. The apparatus according to claim 13, wherein the at least one memory and the computer program code are further configured to, with the at least one processing core, cause the apparatus at least to:
    save the encrypted analyzed result from the cloud service provider;
    in response to a third request from another data requestor for acquiring the same encrypted analyzed result, check the another data requestor's eligibility;
    in response to a negative check result, neglect the third request;
    in response to a positive check result, re-encrypt the saved encrypted analyzed result with the secret key of the third authorized party and a public key of the another data requestor included in the third request, such that the another data requestor is configured to decrypt the re-encrypted analyzed result with a secret key of the another data requestor; and
    send the re-encrypted analyzed result to the another data requestor.

15. The apparatus according to claim 10, wherein the cloud service provider is configured to aggregate the cipher texts; and
    wherein the decrypted analyzed result comprises a sum or a product of the plurality of data providers' data.

16. The apparatus according to claim 11, wherein the homomorphic encryption is based on Paillier cryptosystem.

17. The apparatus according to claim 16, wherein the re-encryption is based on a proxy re-encryption scheme where a secret key corresponding to the homomorphic encryption is a product of the secret key of the third authorized party and the secret key of the data requestor.

* * * * *